United States Patent [19]

Dromard et al.

[11] 4,327,191

[45] Apr. 27, 1982

[54] PREPARATION OF ANION EXCHANGE RESINS BY BROMINATION OF VINYL AROMATIC POLYMERS

[75] Inventors: Adrien Dromard, Paris; Ramanadin, Ales, both of France

[73] Assignee: Rhone-Poulenc Industries, Courbevoie, France

[21] Appl. No.: 178,893

[22] Filed: Aug. 18, 1980

[30] Foreign Application Priority Data

Sep. 7, 1979 [FR] France .................... 79 22394

[51] Int. Cl.³ .................... B01J 41/00; C08F 8/20
[52] U.S. Cl. .................... 521/31; 521/32; 521/28
[58] Field of Search .................... 521/31, 32, 33, 28

[56] References Cited

U.S. PATENT DOCUMENTS

| | | | |
|---|---|---|---|
| T888,007 | 7/1971 | Tuites . | |
| 3,337,479 | 8/1967 | Small | 521/32 |
| 4,246,354 | 1/1981 | Herbin et al. | 521/33 |

FOREIGN PATENT DOCUMENTS

| | | | |
|---|---|---|---|
| 1168080 | 4/1964 | Fed. Rep. of Germany | 521/32 |
| 1071608 | 12/1949 | France | 521/32 |

OTHER PUBLICATIONS

Italian article, "Bromurazione del polistirolo tridimensionale", by G. Maura et al., in 46 *Nuova Chim.* pp. 36-39 (1970).

*Primary Examiner*—William F. Hamrock
*Assistant Examiner*—Peter Kulkosky

[57] ABSTRACT

Process for preparing anion exchange resins comprising polymerizing a vinyl aromatic compound having at least one alkyl group containing about 1 to 3 carbon atoms, alone or mixed with a copolymerizable monomer, optionally in the presence of a mineral support, followed by brominating the alkyl groups of the resulting polymer by means of an N-bromoamide or an N-bromoimide, and then aminating the brominated product obtained. The resulting anion exchange resins are useful in the chemical, pharamaceutical, food, and metallurgical industries.

14 Claims, No Drawings

PREPARATION OF ANION EXCHANGE RESINS BY BROMINATION OF VINYL AROMATIC POLYMERS

BACKGROUND OF THE INVENTION

The present invention relates to a method of preparing anion exchange resins and the resulting anion exchange resins.

Commercial anion exchange resins are generally prepared by chloromethylation of styrene polymers by means of a mono- or bis-chloromethyl ether, followed by amination. However, as the chloromethyl ethers are carcinogenic and corrosive, they are restricted by very strict rules as to their handling.

Various techniques have been proposed in order to avoid the use of these reagents. These techniques generally consist in (1) treating polymers of alkyl vinyl aromatic compounds with chlorine or bromine, or (2) in polymerizing halogenated alkyl vinyl aromatic compounds, and then aminating the resultant products. However, these techniques are not entirely satisfactory since, in the first case, in addition to the desired halogenation of the alkyl group, the aromatic ring and carbon atoms of the chain are also halogenated, and there is the danger of polyhalogenation of the alkyl group, which is harmful to the preparation of the anion exchanger. In the second case, the halogenated alkyl vinyl aromatic compound to be polymerized is obtained either by direct halogenation, in which case the yield is low due to parasitic reactions, or by a complicated, lengthy technique which may result in losses in yield of product.

The process of the invention makes it possible to prepare anion exchange resins from alkyl vinyl aromatic polymers without the use of chloromethyl ethers and without the aforementioned drawbacks occurring. There is a selective monohalogenation of the alkyl group. There is no halogenation of the aromatic ring, nor of the carbons of the chain and no non-specific interaction.

It is, therefore, an object of the present invention to overcome the drawbacks of the above-described prior art processes.

Another object of the invention is to provide a novel process which provides the above-described advantages.

Further objects will be apparent to those skilled in the art from the present description.

GENERAL DESCRIPTION OF THE INVENTION

The process of the preparation of the anion exchange resins in accordance with the present invention comprises:

(1) polymerization of at least one alkyl vinyl aromatic compound by itself, or, optionally, in combination with at least one co-polymerizable monomer;

(2) followed by bromination of the resulting polymer; and then (3) by amination of the resultant brominated polymer, wherein said alkyl vinyl aromatic monomer has at least one alkyl group containing between about 1 and 3 carbon atoms, and the bromination step employs as a bromination agent an N-bromoamide or an N-bromoimide.

The monomers employed in the process of the invention are vinyl aromatic compounds substituted by at least one linear or branched methyl, ethyl, or propyl group. They are, for instance, the isomers of mono- or di-methyl, ethyl, or propyl vinyl benzenes and of methylethyl vinyl benzene; the trimethyl, triethyl, or tripropyl vinyl benzenes, dimethylethyl vinyl benzene, and diethylmethyl vinyl benzene. They are employed along or in combination with each other in all proportions and/or with other copolymerizable monomers, such as styrene, the alkyl acrylates, and methacrylates, whose alkyl group contains about 1 to 5 carbon atoms, acrylonitrile, and butadiene, in proportions of between 0 and about 50 percent by weight referred to the mixture of the monomers and/or furthermore with at least one cross-linking monomer, such as divinylbenzene, vinyltriethoxysilane, or vinyltrihalosilane in proportions of between 0 and about 30 percent, and preferably between about 0.2 and 15 percent by weight, referred to the monomer or monomers employed.

The monomer or monomers are polymerized in accordance with any known technique, including emulsion, suspension, solution, or bulk polymerization, in the presence of initiators which provide free radicals, used in the proportions generally adopted in these polymerizations. Such polymerizations are well known to those skilled in the polymerization art. In this way, there are obtained porous or non-porous polymers whose pore size may be a function, inter alia, of the nature and amount of the cross-linking monomer used. These polymers may be soluble or insoluble in organic media. The polymers are desirably in the form of particles of a diameter of between 10 $\mu$m and 5 mm., in the form of threads, fibers, and granulates.

In accordance with one embodiment of the process of the invention, the monomer or monomers may be polymerized in the presence of a mineral support. In this case, the monomer or monomers, and possibly an initiator, are dissolved in a solvent, the support is impregnated with the solution, and then the solvent is evaporated and the monomer or monomers are polymerized by any known method in order to obtain a polymer film of less than 15 mg./m$^2$ of the surface of the support.

The mineral supports employed, which may be porous or non-porous, have a particle size of between about 1 $\mu$m and 5 mm. and are represented by balls of glass, silicas, and metallic oxides, such as titanium oxide or the aluminas.

As solvents for the impregnation of the support, there may be employed any products which are solvents for the monomer or monomers and the initiator and the boiling point of which is preferably as low as possible in order to favor the subsequent evaporation and removal of the solvent. They include, among others, ethylether, benzene, acetone, ethylacetate, and halogenated hydrocarbons, such as methylene chloride.

The choice of the polymer and the polymer-coated support is a function of the use of the anion exchange resin. The polymer-coated support is preferable when, for instance, use requires great mechanical stability.

The bromination of the polymer, whether on a support or not, is obtained by reaction between the alkyl groups of the resulting polymer and the bromination agent, possibly in the presence of an initiator, in an organic medium.

The bromination agents are represented by the N-bromoamides, such as N-bromoacetamide, N,N-dibromobenzene sulfonamides; the N-bromoimides, such as N-bromosuccinimide, N-bromophthalimide, N-bromoglutarimide, 3-bromo-hydantoin, and 1,3-dibromo-5,5-dimethylhydantoin. These bromination agents are used in amounts of between about 0.1 and 3 times the molar stoichiometric amount referred to the alkyl group or groups of the polymer. The amount of bromination agent is preferably close to the stoichiometric molar amount which gives the maximum exchange capacity to the anion exchange resin to be produced. Thus, the exchange capacity of the anion exchange resin may vary, as desired, depending on the amount of bromination agent used.

The bromination initiator is selected from among acyl peroxides, such as benzoyl peroxide, ditertiobutyl peroxide, and the azo-nitriles, such as azo-bis-isobutyronitrile. The initiator is used alone or in combination, in proportions of between 0 and about 2 percent by weight of the polymer. The bromination reaction may also be initiated by means of ultraviolet radiations.

The organic medium, in which the polymer and the initiator are soluble or insoluble, and in which the bromination agent is insoluble or only very slightly soluble, is represented, for instance, by acetic acid, dioxane, cyclohexane, and, preferably, carbon tetrachloride. The amount of the organic medium to be used is greater than about 200 percent by weight, referred to the polymer or to the polymer-coated support.

The bromination temperature, which is a function of the eventual initiator, is generally between about 40° and 130° C., and is, preferably, the boiling point of the organic medium.

The reaction is complete after a period of time of between about 30 minutes and 5 hours. The product formed is then filtered and washed with a solvent for the amide or imide formed, such as, for instance, water, and a solvent for the N-bromoamide or N-bromoimide, such as, for instance, acetone and organic acetates.

In order to obtain the anion exchange resin, the brominated polymer or the support coated with the brominated polymer is reacted with a primary, secondary, or tertiary amine, this reaction being carried out in accordance with any known technique.

The anion exchange resins thus obtained by the process of the invention are in the form of particles of a size of between about 1 μm and 5 mm., filaments, films, or granulates. They may be used for the demineralization of liquids and for chemical and enzymatic catalyses, as well as purification of metals and amino acids in the chemical, pharmaceutical, food, and metallurgical industries.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 1

Into 200 g. of water containing 0.2 g. of polyvinyl alcohol, there were dispersed, with agitation, 82 g. of vinyl toluene (60:40 mixture of para- and meta-isomers), 7.5 g. of divinylbenzene, and 0.2 g. of azo-bis-isobutyronitrile. The agitated resultant dispersion was heated to 80° C. and held at this temperature for 5 hours.

The beads of cross-linked polyvinyltoluene which were formed were filtered, washed with water, and then with acetone, and then dried in vacuum at 50° C. The beads had a size of between 200 and 400 μm.

20 g. of these beads were introduced into 100 ml. of carbon tetrachloride containing, suspended therein, 30.2 g. of N-bromosuccinimide and 0.1 g. of benzoyl peroxide. The suspension was heated to the boiling point and held at this temperature for 4 hours. After cooling, the polymer beads were filtered, washed with acetone and water, and then dried under vacuum at 50° C.

Analysis showed that the polymer contained 57.50 percent carbon and 36.70 percent bromine.

10 g. of the resulting brominated polymer beads were placed in suspension in 40 ml. of diethylamine, left in contact for 4 hours at room temperature, filtered, washed with water and acetone, and then dried under vacuum at 50° C. An anion exchange resin obtained had —N—(C$_2$H$_5$)$_2$ functional groups and had the following characteristics:

| carbon content | 79.90% |
|---|---|
| bromine content | 4.20% |
| nitrogen content | 5.30% |
| exchange capacity | 3.90 meq./g. |

COMPARISON EXAMPLE

By way of comparison, beads of cross-linked polyvinyl toluene of Example 1 were brominated by elemental bromine, as follows:

20 g. of the beads were dispersed in 100 ml. of carbon tetrachloride, whereupon 20 ml. of bromine were added. The suspension was heated to the boiling point and held at this temperature for 4 hours, while being irradiated by a low pressure mercury vapor lamp. After cooling, the beads were filtered, washed with acetone and water, and then dried under vacuum at 50° C. The product obtained had the following characteristics:

| carbon content | 62% |
|---|---|
| bromine content | 33% |

10 g. of the resulting brominated polymer beads were treated with diethylamine, as in Example 1, above. The characteristics of the product obtained were:

| carbon content | 65% |
|---|---|
| bromine content | 30% |
| nitrogen content | 0.30% |
| exchange capacity | 0.10 meq./g. |

It is noted that there was bromination of the polymer, but that contrary to the polymer of Example 1, the majority of the bromine atoms fixed were not replaced by anion exchange groups.

EXAMPLE 2

Example 1, above, was repeated, but the bromination was effected with 60 ml. of carbon tetrachloride containing 24.8 g. of N-bromoacetamide and 0.1 g. of benzoyl peroxide.

The characteristics of the brominated product were:

| carbon content | 62.20% |
|---|---|

| | |
|---|---|
| bromine content | 29.10% |

The characteristics of the resulting anion exchange resin were:

| | |
|---|---|
| carbon content | 73.70% |
| bromine content | 1.30% |
| nitrogen content | 3.50% |
| exchange capacity | 0.73 meq./g. |

EXAMPLE 3

10 g. of brominated polymer beads identical to those produced by Example 1 were placed in suspension in 40 ml. of a 10 percent aqueous solution of trimethylamine and left in contact for 4 hours at room temperature. After filtration, washing with water and acetone, and drying under vacuum at 50° C., there was obtained an anion exchange resin which contained —N(+)—CH$_3$)$_3$Br(—) functional groups and which had the following characteristics:

| | |
|---|---|
| carbon content | 59.50% |
| bromine content | 24.90% |
| nitrogen content | 5% |
| exchange capacity | 3.60 meq./g. |

EXAMPLE 4

100 g. of porous silica, having a particle size of 100 to 200 μm, a specific surface of 37 m$^2$/g., an average pore diameter of 1200 Angstroms, and a pore volume of 0.95 ml./g. were introduced into a solution formed of 150 ml. of methylene chloride, 44.5 g. of vinyl toluene (60:40 mixture of para- and meta-isomers), 13 g. of vinyl triethoxysilane, and 0.5 g. of azo-bis-isobutyronitrile. The methylene chloride was evaporated at room temperature and atmospheric pressure, whereupon the impregnated silica was heated at 120° C. for 6 hours in order to obtain crosslinking of the polymer.

The polymer-coated silica was then placed in suspension in 300 ml. of ethyl acetate and heated at the boiling point for 6 hours in order to eliminate the noncrosslinked polymer. After filtration, washing with acetone, and drying at 80° C., there was obtained a polymer-coated silica having a carbon content of 10.6 percent by weight.

50 g. of the polymer-coated silica obtained were introduced into 200 ml. of carbon tetrachloride containing, in suspension, 10 g. of N-bromosuccinimide and 0.8 g. of benzoyl peroxide, whereupon the suspension was heated at the boiling point for 4 hours. After cooling, the silica was filtered, washed with acetone and then with water and, finally, dried at 50° C. The product obtained had the following characteristics:

| | |
|---|---|
| carbon content | 9% |
| bromine content | 6.80% |
| nitrogen content | 0% |

The product was placed in suspension in 200 ml. of a 10 percent aqueous solution of trimethylamine and left in contact for 4 hours at room temperature. After filtration, washing with water and acetone, and drying under vacuum at 50° C., there was obtained a silica coated with an anion exchange resin bearing —N(+)—CH$_3$)$_3$Br(—) functional groups, the characteristics of which product were as follows:

| | |
|---|---|
| carbon content | 9.30% |
| bromine content | 3.20% |
| nitrogen content | 0.54% |
| amount of polymer fixed | 4.40 mg./m$^2$ |
| exchange capacity | 3.90 meq./g. |

EXAMPLE 5

Example 4 was repeated, but the 50 g. of polymer-coated silica, the carbon content of which was 10.6 percent by weight, were introduced into 200 ml. of carbon tetrachloride containing, in suspension, 8.5 g. of bromosuccinimide, instead of 10 g., and 0.8 g. of azo-bis-isobutyronitrile, instead of the benzoyl peroxide.

The brominated product had the following properties:

| | |
|---|---|
| carbon content | 8.90% |
| bromine content | 6.40% |
| nitrogen content | 0% |

The resulting silica coated with anion exchange resin had the following properties:

| | |
|---|---|
| carbon content | 9.20% |
| bromine content | 2.80% |
| nitrogen content | 0.48% |
| amount of polymer fixed | 4.20 mg./m$^2$ |
| exchange capacity | 0.35 meq./g. |

EXAMPLE 6

Example 4 was repeated, with 12.7 g. of N-bromophthalimide, instead of 10 g. of N-bromosuccinimide.
The characteristics of the brominated product were:

| | |
|---|---|
| carbon content | 9.50% |
| bromine content | 6.70% |
| nitrogen content | 0% |

The characteristics of the resulting anion exchange resin were:

| | |
|---|---|
| carbon content | 9.90% |
| bromine content | 3.20% |
| nitrogen content | 0.44% |
| amount of polymer fixed | 4.50 mg./m$^2$ |
| exchange capacity | 0.32 meq./g. |

EXAMPLE 7

Example 4 was repeated, with 17.6 g. of 1,3-dibromo-5,5-dimethyl hydantoin as the brominating agent.
The characteristics of the brominated product were:

| | |
|---|---|
| carbon content | 9.50% |
| bromine content | 6.60% |
| nitrogen content | 0% |

The characteristics of the resulting anion exchange product were:

| | |
|---|---|
| carbon content | 9.80% |
| bromine content | 3.50% |
| nitrogen content | 0.39% |
| amount of polymer fixed | 4.50 mg./m² |
| exchange capacity | 0.27 meq./g. |

EXAMPLE 8

Example 4 was repeated, with acetic acid in place of carbon tetrachloride.

The characteristics of the brominated product were:

| | |
|---|---|
| carbon content | 9.10% |
| bromine content | 6.10% |
| nitrogen content | 0% |

The characteristics of the anion exchange product were:

| | |
|---|---|
| carbon content | 9.80% |
| bromine content | 2.90% |
| nitrogen content | 0.42% |
| amount of polymer fixed | 4.40 mg./m² |
| exchange capacity | 0.30 meq./g. |

EXAMPLE 9

Example 4 was repeated, but the 0.8 g. of benzoyl peroxide was replaced by irradiation with a low pressure mercury vapor lamp, and the heating at the boiling point was maintained for 2 hours and not 4.

The characteristics of the brominated product were:

| | |
|---|---|
| carbon content | 9.10% |
| bromine content | 6.70% |
| nitrogen content | 0% |

The characteristics of the anion exchange product were:

| | |
|---|---|
| carbon content | 9.20% |
| bromine content | 3.25% |
| nitrogen content | 0.52% |
| amount of polymer fixed | 4.40 mg./m² |
| exchange capacity | 0.38 meq./g. |

EXAMPLE 10

50 g. of porous silica having a particle size of 100 to 200 μm, a specific surface of 37 m²/g., an average pore diameter of 1200 Angstroms, and a pore volume of 0.95 ml./g. were introduced into a solution formed of 100 ml. of methylene chloride, 35.5 g. of 2,4-dimethyl styrene, 2.25 g. of vinyl triethoxysilane, and 0.25 g. of azo-bis-isobutyronitrile. The methylene chloride was evaporated at room temperature and atmospheric pressure, whereupon the impregnated silica was heated at 130° C. for 20 hours under its own pressure in order to obtain crosslinking.

The resulting polymer-coated silica was then placed in suspension in 300 ml. of ethyl acetate and heated at the boiling point for 6 hours, in order to eliminate the non-cross-linked polymer. After filtering, washing with acetone, and drying at 80° C., a polymer-coated silica was obtained having a carbon content of 12.3%.

50 g. of the resulting polymer-coated silica obtained were introduced into 200 ml. of carbon tetrachloride, containing in suspension 10.5 g. of N-bromosuccinimide and 0.8 g. of benzoyl peroxide, whereupon the suspension was heated at the boiling point for 4 hours. After cooling, the treated, polymer-coated silica was filtered, washed with acetone and then with water, and finally dried at 50° C. The product obtained had the following properties:

| | |
|---|---|
| carbon content | 11.1% |
| bromine content | 8.05% |
| nitrogen content | 0% |

The resulting product was placed in suspension in 200 ml. of a 10 percent aqueous solution of trimethylamine and left in contact for 4 hours at room temperature. After filtration, washing with water and acetone, and drying in vacuum at 50° C., there was obtained a silica coated with an anion exchange resin bearing —N$^{(+)}$—CH$_3$)$_3$Br(—) functional groups, the properties of which anion exchange material were as follows:

| | |
|---|---|
| carbon content | 13.50% |
| bromine content | 5.90% |
| nitrogen content | 1.20% |
| amount of polymer fixed | 7.20 mg./m² |
| exchange capacity | 0.68 meq./g. |

EXAMPLE 11

10 g. of silica coated with brominated polymer identical to that of Example 10, were placed in suspension in 40 ml. of diethylamine, left in contact for 4 hours at room temperature, filtered, washed with water and acetone, and then dried under vacuum at 50° C. An anion exchange resin was obtained which had —N—(C$_2$H$_5$)$_2$ functional groups and which anion exchange product had the following properties:

| | |
|---|---|
| carbon content | 15.03% |
| bromine content | 1.56% |
| nitrogen content | 1.16% |
| amount of polymer fixed | 7 mg./m² |
| exchange capacity | 0.65 meq./g. |

EXAMPLE 12

100 g. of silica having a particle size of 5–7 μm, a specific surface of 600 m²/g., an average pore diameter of 40 Angstroms, and a pore volume of 0.91 ml./g. were introduced into a solution formed of 300 ml. of methylene chloride, 53.5 g. of vinyl toluene (60:40 mixture of para- and meta-isomers), 13.5 g. of vinyl triethoxysilane, and 0.5 g. of azo-bis-isobutyronitrile. The methylene chloride was evaporated at room temperature and atmospheric pressure, whereupon the impregnated silica was heated at 120° C., for 6 hours in order to obtain the cross-linking.

The thus-treated silica was then placed in suspension in 300 ml. of ethyl acetate and heated at the boiling point for 6 hours in order to eliminate the noncross-linked polymer. After filtration, washing with acetone, and drying at 80° C., a polymer-coated silica was obtained, the carbon content of which was 23.1%.

50 g. of the resulting polymer-coated silica obtained were introduced into 200 ml. of carbon tetrachloride containing, in suspension, 23.3 g. of N-bromosuccinimide and 0.8 g. of benzoyl peroxide, whereupon the resulting suspension was heated at the boiling point for 4 hours. After cooling, the silica was filtered, washed with acetone and then with water, and finally dried at 50° C. The product obtained had the following properties:

| | |
|---|---|
| carbon content | 20.30% |
| bromine content | 15.70% |
| nitrogen content | 0% |

The product was placed in suspension in 200 ml. of a 10 percent aqueous solution of trimethylamine and left in contact for 4 hours at room temperature. After filtration, washing with water and with acetone, and drying under a vacuum at 50° C., there was obtained a silica coated with an anion exchange resin bearing —N$^{(+)}$—(CH$_3$)$_3$Br$^{(-)}$ functional groups, the properties of which anion exchange product were as follows:

| | |
|---|---|
| carbon content | 20.70% |
| bromine content | 5.90% |
| nitrogen content | 0.92% |
| amount of polymer fixed | 0.68 mg./m$^2$ |
| exchange capacity | 0.67 meq./g. |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process of preparing anion exchange material, which process comprises the steps: (a) polymerizing at least one alkyl vinyl aromatic monomer having at least one alkyl group containing about 1 to 3 carbon atoms in the presence of a mineral support in order to form a polymer film of less than 15 mg/m$^2$ on the surface of said mineral support; (b) brominating in an organic medium the alkyl groups of the polymer with a brominating agent selected from the group consisting of N-bromoamides and N-bromoimides; and (c) aminating the resulting brominated polymer.

2. A process according to claim 1, wherein in step (a) the alkyl vinyl aromatic compound is copolymerized with at least one other copolymerizable monomer.

3. A process according to claim 1, wherein the alkyl vinyl aromatic monomer is selected from the group consisting of the isomers of mono- and di-methyl, ethyl, and propyl vinyl benzenes and methylethylvinylbenzene, the trimethyl, triethyl, and tripropylvinylbenzenes, dimethylethylvinylbenzene, and diethylmethylvinylbenzene.

4. A process according to claim 2, wherein the copolymerizable monomer is selected from the group consisting of styrene, the alkyl acrylates and methacrylates, acrylonitrile, and butadiene and is employed in proportions of between 0 and about 50 percent by weight of the total weight of the mixture of monomers.

5. A process according to claim 1, wherein a cross-linking monomer is used in step (a) in proportions of between 0 and about 30 percent be weight based on the monomer or monomers employed.

6. A process according to claim 1, wherein the mineral support is selected from the group consisting of balls of glass, silicas, and metallic oxides.

7. A process according to claim 6, wherein the metallic oxides are selected from the group consisting of titanium oxide and alumina.

8. A process according to claim 1, wherein the bromoamides are selected from the group consisting of N-bromoacetamide and N,N-dibromobenzene sulfonamides and the bromoimides are selected from the group consisting of N-bromosuccinimide, N-bromophthalimide, N-bromoglutarimide, 3-bromo-hydantoin, and 1,3-dibromo-5,5-dimethylhydantoin.

9. A process according to claim 1, wherein the amount of brominating agent is about 0.1 to 3 times the stoichiometric molar amount based on the alkyl group or groups of the polymer.

10. A process according to claim 1, wherein a bromination initiator is employed in step (b) in proportions of up to about 2 percent by weight of the polymer and is selected from the group consisting of acyl peroxides and azonitriles.

11. A process according to claim 1, wherein ultraviolet radiation is employed to initiate bromination.

12. A process according to claim 1, wherein the organic medium in step (b) is selected from the group consisting of acetic acid, dioxane, cyclohexane, and carbon tetrachloride and is employed in an amount greater than about 200 percent by weight of the polymer.

13. A process according to claim 1, wherein the bromination is effected at a temperature of between about 40° and 130° C. and within a period of time of between about 30 minutes and 5 hours.

14. Ion exchange resins obtained by the process of claim 1, in the form of particles of about 1 μm to 5 mm.

* * * * *